Figures 5, 6, 7:
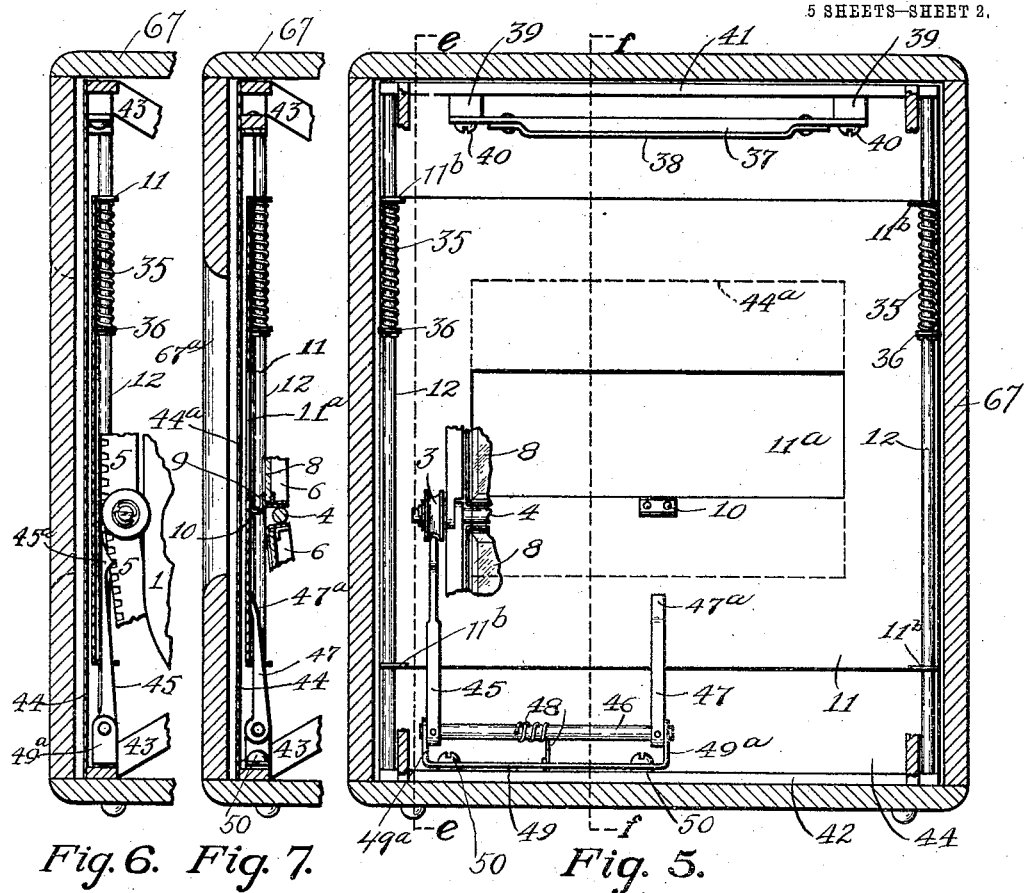
Figures 8, 9:
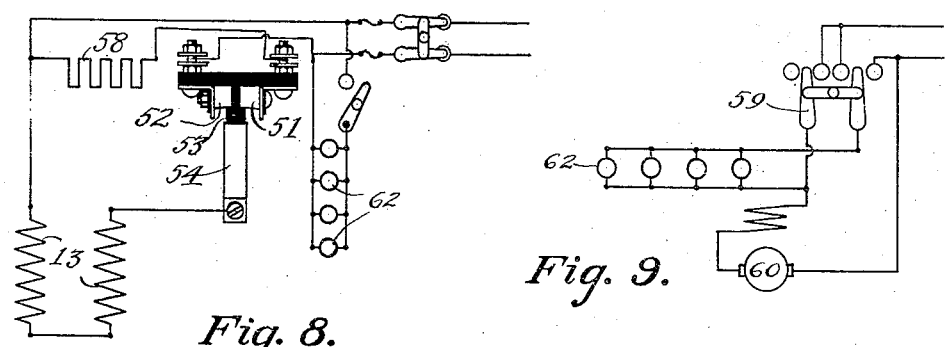

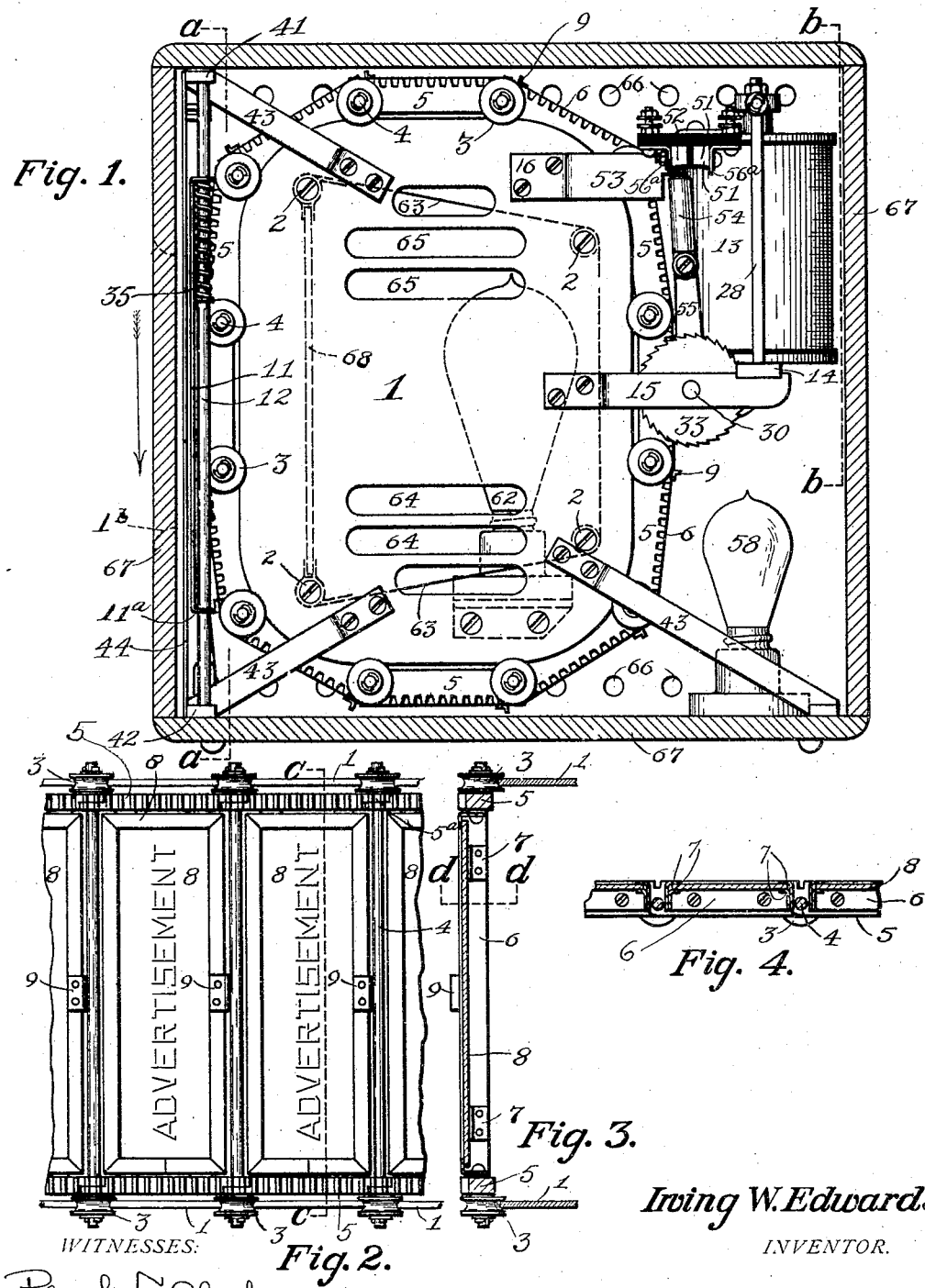

I. W. EDWARDS.
CHANGEABLE EXHIBITOR.
APPLICATION FILED FEB. 5, 1912.

1,054,098.

Patented Feb. 25, 1913.

5 SHEETS—SHEET 2.

WITNESSES:
Paul F. Clark
Otto de Languil te.

Irving W. Edwards,
INVENTOR

BY
Brandenburg
ATTORNEY.

I. W. EDWARDS.
CHANGEABLE EXHIBITOR.
APPLICATION FILED FEB. 5, 1912.
1,054,098.
Patented Feb. 25, 1913.
5 SHEETS—SHEET 3.
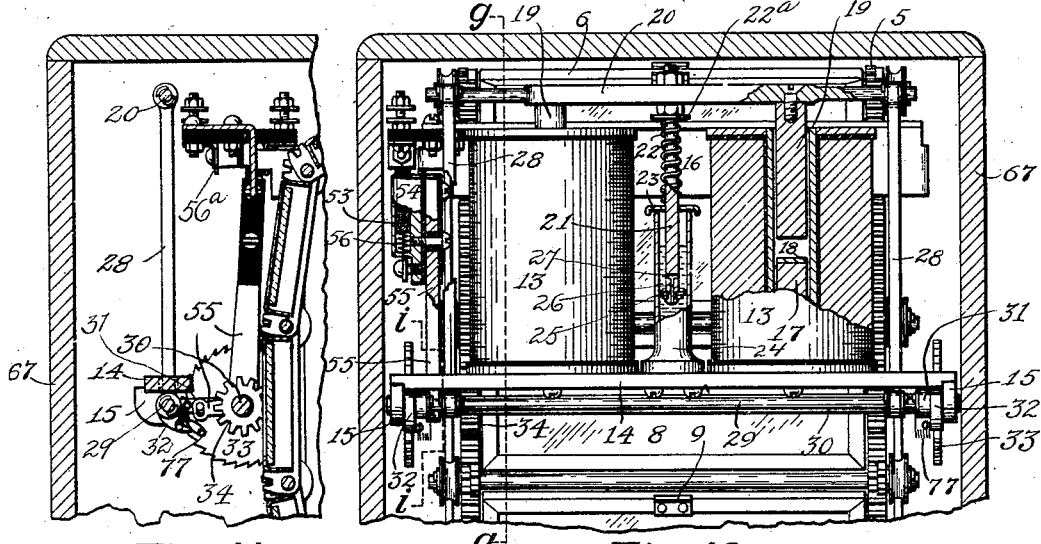
Fig. 11.   Fig. 10.
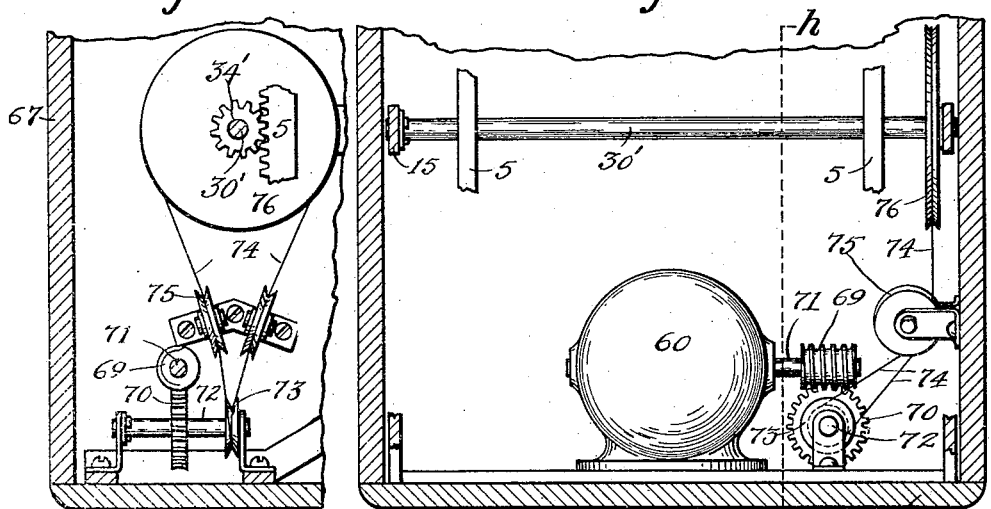
Fig. 15.   Fig. 14.
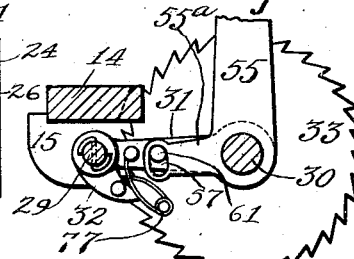
Fig. 12.   Fig. 13.
WITNESSES:
Paul L. Clark
Otto de Languilette
Irving W. Edwards
INVENTOR.
BY 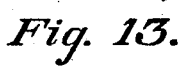
ATTORNEYS.

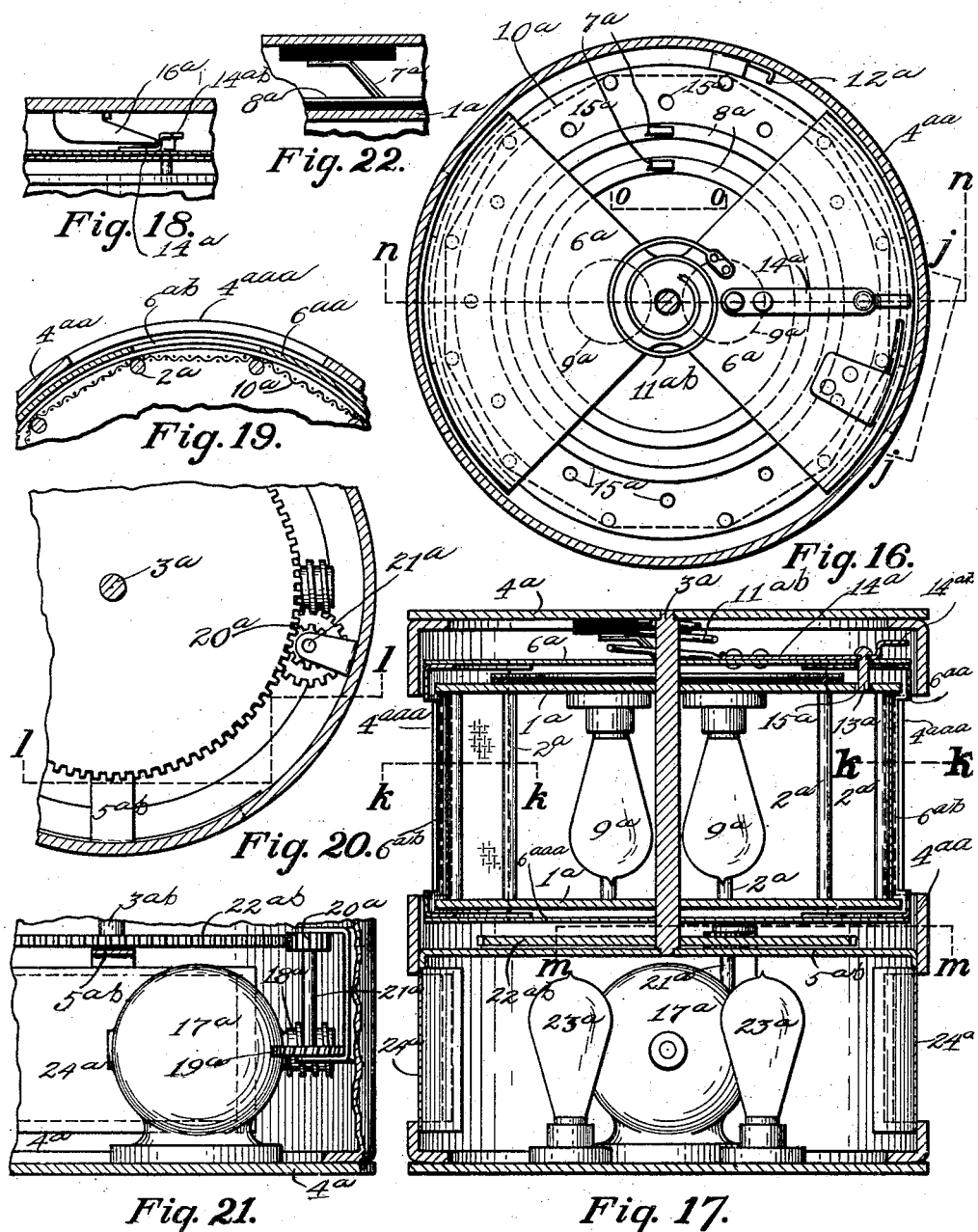

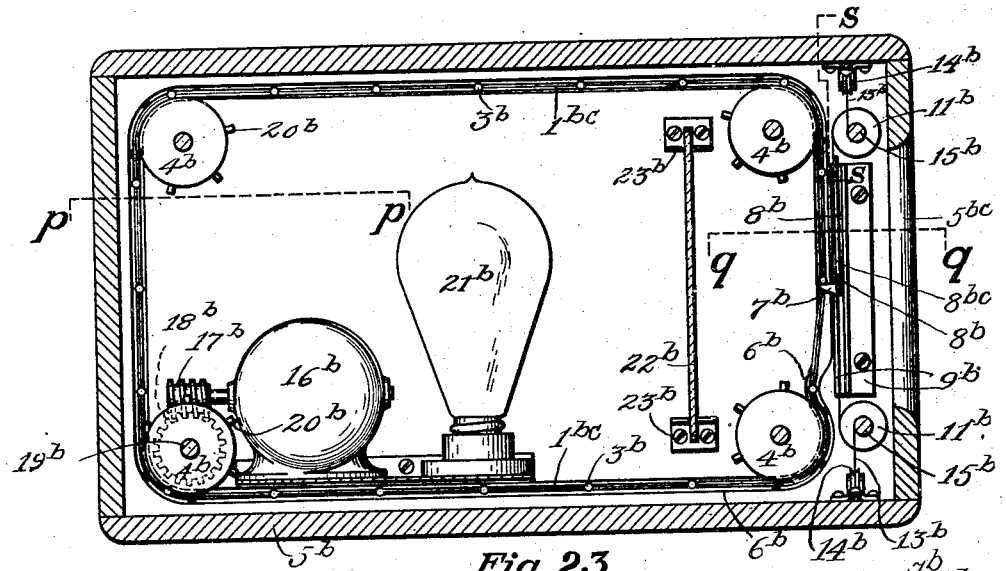
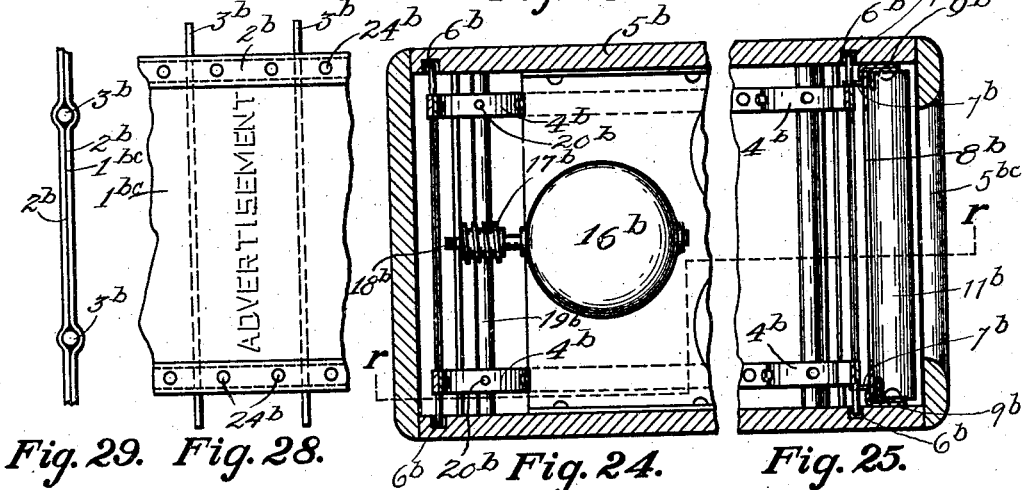
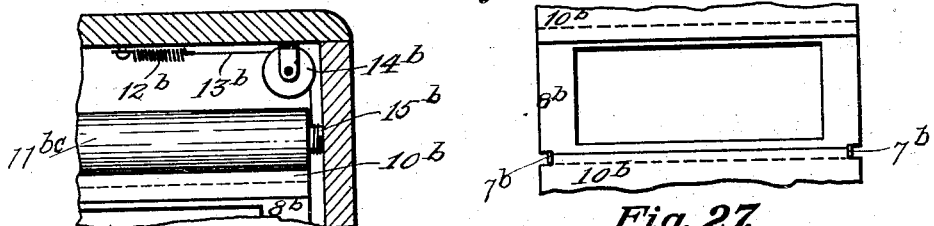

UNITED STATES PATENT OFFICE.

IRVING W. EDWARDS, OF BROOKLYN, NEW YORK.

CHANGEABLE EXHIBITOR.

1,054,098.     Specification of Letters Patent.     Patented Feb. 25, 1913.

Application filed February 5, 1912. Serial No. 675,483.

*To all whom it may concern:*

Be it known that I, IRVING W. EDWARDS, a citizen of the United States, residing at Brooklyn, in the county of Kings and State of New York, have invented new and useful Improvements in Changeable Exhibitors, of which the following is a specification.

My invention appertains to that general class of inventions known by the generic title of "changeable exhibitors".

An important object of the invention is to provide an advertisement exhibitor, of this character, wherein an intermittently-movable shutter is employed, timed in its movements relative to the traveling sign-body whereby individual panels are successively exposed to view for a longer period than is possible with a stationary shutter, as has been commonly employed heretofore. In other words, ordinarily, in changeable advertisement exhibitors, the advertisement-strip or body travels across a stationary opening, so that the public sees the full area of the advertisement for a moment or so, only, the remainder of the time the opening in the shutter being occupied by parts of two sections or panels of the strip. But, with my invention, one advertising section, only, is visible at a time, and for a considerable period, comparatively speaking.

Another object of the invention is to provide a device of this nature wherein the traveling sign-body or apparatus and the intermittently-movable shutter, correlated as aforesaid, are actuated by electrically-controlled instrumentalities.

Subsidiary objects relate to improvement in specific features of the apparatus, whereby the machine or mechanism, as an entirety, presents the maximum of simplicity, efficiency and durability, with the minimum consumption of power.

Certain objects, not specifically enumerated hereinabove, will appear as the specification proceeds and the nature of the invention more fully appears.

In the accompanying drawing, I have illustrated the basic type, or preferred form, of my invention, together with certain modifications, and in these drawings like reference-characters indicate corresponding parts throughout the specification.

Briefly described: Figure I is a side elevation of the operative parts of the basic type, or preferred form, of my invention, the outer case or boxing (in which the operative parts are disposed) being shown in vertical section; Fig. II is a fragmentary top plan view of the traveling sign-mechanism; Fig. III is a section taken on the line $c-c$, Fig. II; Fig. IV is a section taken on the line $d-d$, Fig. III; Fig. V is a section taken on the line $a-a$, Fig. I; Figs. VI and VII are sections taken on the lines $e-e$, and $f-f$, respectively, of Fig. V; in Figs. V, VI and VII only so much of the sign-panels are shown (and these fragmentarily) as is necessary to an understanding of the operation of the shutter; Fig. VIII is a diagrammatic view of the solenoid-motor circuit; Fig. IX is a diagrammatic view, showing a method of connecting rotary motor driven machines, so as to use, in the case of a series motor, the illuminating lamps for starting resistance; Fig. X is a fragmentary section taken on the line $b-b$, Fig. I, certain parts being broken away; Fig. XI is a section taken on the line $g-g$, Fig. X; Fig. XII is a fragmentary sectional detail view of the dashpot and plunger; Fig. XIII is an enlarged section taken on the line $i-i$, Fig. X; Fig. XIV is a fragmentary, partly sectional view, showing the use of a rotary motor and its operative connections to the sign-traveling mechanism for actuating the latter, said rotary motor and its operative connections being a substitution and alternative for the solenoids and their operative connections to the sign-traveling mechanism, as shown in the prior views; only such parts as are essential to an understanding of the transmission of the motor-energy to the movable sign-mechanism being shown in Fig. XIV; Fig. XV is a fragmentary section taken on the line $h-h$, Fig. XIV; Fig. XVI is a horizontal section of a modification, which I term my "cylinder-type machine", the section being taken just below the upper cover of said "cylinder machine"; Figs. XVII and XVIII are sections taken, respectively, on the lines $n-n$, and $j-j$, of Fig. XVI; Fig. XIX is a section taken on the line $k-k$, and also on the line K—K, Fig. XVII; Fig. XX is a section taken on the line $m-m$, Fig. XVII; Fig. XXI is a section taken on the line $l-l$, Fig. XX, with the lamps omitted for the sake of clearness of illustration of the other parts; Fig. XXII is a section taken on the line o—o, Fig. XVI; Fig. XXIII is a longitudinal vertical sectional view of a still further modification, the section being taken on the line r—r, Figs. XXIV and XXV; Figs. XXIV and XXV are sectional views, taken, respectively, on the lines p—p, and q—q, Fig. XXIII; Fig. XXVI is an enlarged section, taken on the line s—s, Fig. XXIII; Fig. XXVII is a fragmentary detail view, in elevation, of the shutter of the device of Figs. XXIII et seq., looking at the back of said shutter; Fig. XXVIII is an enlarged fragmentary detail view, in top plan, of the traveling sign-body of Fig. XXIII et seq.; and Fig. XXIX is a fragmentary detail side view, still further enlarged, of the traveling sign-body of Figs. XXIII et seq.

Referring, now, in detail to the drawings, and, first, to Figs. I to XV thereof: 67 indicates a suitable casing or housing for the operative parts of the mechanism, which may be of any appropriate or desired shape and dimensions, according to the exigencies of the particular situation.

1, 1 designate spaced track-members, in this instance in the form of plates, of any suitable shape, in this instance shown substantially oblong, with rounded corners, which may be suspended, as in a vertical position, in any suitable manner, preferably by braces 43 secured at one end to said track-members and at the other end to some stationary part. The track-members 1, 1, may, also, be held in a position of spaced relationship in any suitable manner, preferably by horizontal rods 2 (any number thereof being employed, as found advisable). The circumferential edges of these track-members 1, 1 constitute tracks or guides for circumferentially-grooved wheels or rollers 3, revolubly suspended on shafts or axles 4 supporting, transversely thereof, two endless, chainlike gear-racks 5, 5, i. e., each of these gear-racks comprises sections, units, or links (as shown), each section being disposed between two adjacent shafts 4 (as shown), and the sections being suitably hinged or otherwise jointed together, so as to give to the racks the requisite flexibility to permit them to revolve around, and to follow the circumferential contour of, the track-members 1, 1 (as shown in Fig. I). The outer longitudinal edge of each section is formed with teeth (as shown) constituting a rack. The connection between each two adjacent sections of each gear-rack 5 is an overlapping joint $5^{ah}$, the teeth of adjacent parts of said overlapping joint being in alinement with each other when two or more successive links or units of each of the gear-racks 5 are in one plane, i. e., lie in a straight line. Between each pair of said sections or units of the gear-racks 5, i. e., between each section of one of the gear-racks and the corresponding section of the other gear-rack, and secured to the racks 5, 5, is a frame 6, in which is held, as by clips 7, a translucent panel or pane 8, which may bear various advertising legends, the exposure of which, successively, in connection with the timed movement of the shutter (hereinafter described), is an important object of my invention. Each frame 6, with its panel 8, constitutes a "sign-unit."

The invention contemplates means for moving the shutter in timed relation with the movement of successive "sign-units," and these means may, conceivably, take various forms. But I prefer that such correlated movement of the shutter and "sign-units" shall be effected by locking the "sign-units" to the shutter. While these locking means may take various forms, I prefer to provide coöperating locking-mechanism on the shutter and on the "sign-units." For instance, the locking-mechanism on the "sign-units" may reside in clips 9, each clip being carried by one of the frames 6 and projecting above the panels 8, which clips engage successively and intermittently the coöperating locking-mechanism on a vertically-positioned shutter 11 (which is, preferably, a flat plate of thin metal), such coöperating locking-mechanism comprising, in this instance, a single clip 10 carried on the inner surface of said shutter and disposed, preferably, immediately below the shutter-aperture $11^a$, which is desirably of the area of a panel 8.

The shutter 11 is suitably vertically supported, as by having bent ears $11^b$ at the four corners thereof, through which extend, loosely, two rods 12, 12. Thus, the shutter 11 travels in a vertical plane, only, being vertically reciprocable on said rods 12, 12.

Encircling each rod 12 and disposed between the top corner ear through which said rod projects and between a fixed collar 36 on said rod is a coiled spring 35, operating to return the shutter to normal position, after downward travel thereof, as hereinafter described.

The shutter-rods 12, 12 may be variously held so as to insure rigidity and perpendicularity thereof: In this instance, I show, as a desirable manner, upper and lower supports 41, 42, respectively. The braces 43 (see Fig. I especially) may be secured, at their ends, to said rod-supports 41, 42. Further to insure rigidity and perpendicularity of the shutter-rods 12, 12, a thin, preferably metallic, plate 44 may be secured to the upper and lower rod-supports 41, 42, said plate extending the entire length of the latter. This plate 44 has an opening therethrough $44^a$, which is larger than the shutter-opening $11^a$, i. e., extends above and below the latter, and is of the same area as an opening $67^a$ in the outer casing 67.

If desired, suitable means may be provided, as a buffer or a stop, to limit the upward throw of the shutter 11, under the influence of the springs 35, 35, and, while these means may take various forms, I prefer that shown herein, which comprises a bridge 37, of suitable material (such as spring metal), advantageously carrying a leather or fiber strip 38 upon its under surface. The bridge is preferably secured, at its ends, as by screws 40, to cushions 39, which may be rubber or felt compressible blocks, the screws 40 being tapped into the upper rod-support 41 (all as shown in Fig. V). There is, thus, in the buffer-mechanism just hereinabove described, two points of yield—first, in the bridge 37 (of spring material), and, second, in the rubber cushions 39, 39.

The panels 8 preferably move in the direction of the arrow in Fig. I, i. e., they approach the shutter-opening 11ª from the top thereof and travel downward across said opening; so that, immediately upon a panel 8 arriving flush with the shutter-opening 11ª, the outward-projecting lip of its clip 9 impinges against the corresponding inward-projecting lip of the clip 10, whereby the panel becomes temporarily locked to the shutter 11, and the shutter, therefore, travels downward simultaneously with said panel for a predetermined distance before becoming disengaged therefrom. In this manner, each advertising-section is visible for a considerable period, comparatively speaking, and, also, one advertising section, only, is visible at a time, in contradistinction with customary methods, wherein the advertisement-strip or body travels across a stationary opening, so that the public sees the full area of the advertisement for a moment or so, only, the remainder of the time the opening in the shutter being occupied by parts of two sections or panels of the strip, or else a plurality of panels are fully visible at one time.

Various mechanisms may be utilized to cause the shutter 11 to become released, at the proper time, from the panel, after having been temporarily locked thereto, as hereinabove described, and, while these mechanisms may, conceivably, take various forms, I prefer that shown in the drawings; which comprises the following instrumentalities: A rocker-arm 45 carries, on its upper end a pawl or cam 45ª, and is rigidly secured, at its lower end, to a rock-shaft 46 journaled for movement in the upturned ends or ears 49ª of a bracket 49 secured, as by screws 50, 50, to the lower rod-support 42. By screwing these screws farther in or out, the rocker-arm 45 may be raised or lowered, as desired, so as to effect adjustments in the point of release of the shutter 11. The shaft 46 also carries, rigidly fixed thereto, an arm 47, which, in the normal position of the rocker-arm 45, bears lightly against the inner surface of the metallic shutter 11; the rocker-arm 45, the shaft 46, and the arm 47 being maintained in said normal position by means of a spring 48. In the normal position of the shutter 11, the cam 45ª of the rocker-arm 45 is somewhat below the clip 10 and the bottom of the shutter-opening 11ª, and is in the path of movement of the wheel 3 of the specific panel 8 to which the shutter 11 has been temporarily locked, as aforesaid: Consequently, when a panel 8 has been locked to the shutter 11, said panel 8 and the shutter move simultaneously downward but a short distance before the said wheel 3 strikes against the lip of the cam 45ª, swinging the cam and the arm 45 outward, which movement is transmitted, through the shaft 46, to the arm 47, which causes the upper end 47ª to bear forcibly against the metallic shutter 11, and, consequently, bends or buckles the shutter outward sufficiently to release the clips 9 and 10 from coöperative locking engagement. Thereupon, the shutter 11 flies upward, under the stress of the springs 35, 35, to the buffer or stop 37, and then resumes its normal position, as shown in Fig. V, in position to be engaged by the clip of the next succeeding panel 8.

It will thus be seen that my invention comprehends, broadly, means for effecting movement of the shutter 11, timed in a novel manner in relation to the movement of the panels 8: While I have shown, as an efficient means of so effecting step-by-step or intermittent movement of the shutter 11 simultaneously with the movement of the panels, successively, during a predetermined period of the movement of each one, successively, in the series of panels, the locking of a panel, at a predetermined moment of and for a predetermined interval during its travel, yet this is simply for the sake of illustration, since I recognize that such timed movement of the shutter with relation to successive panels may be accomplished in other ways, without in any wise locking the panels to the shutter. My broad idea is, as said, to effect movement of the shutter intermittently, timed in relation to the movement of successive panels, to accomplish the object which I have in view, which is to make the advertisement on each panel visible for a longer period of time than if an immovable or stationary shutter were employed, as heretofore.

*The actuating mechanism for the panels.—* The mechanism for effecting continuous movement of the endless series of panels 8 may, obviously, be of many different constructions; but I prefer to use the form shown in the drawings, which I have given as an example of a simple, convenient and entirely practicable mechanism. Said preferred form of mechanism, therefore, will now be described, as follows: Motion is given to the series of panels 8 by means of a pair of solenoids 13, 13, supported in any desired manner, as at the bottom, by an iron yoke 14, which, in turn, may be supported by the brackets 15, 15 secured to the plates 1, 1. A bracket 16 serves as the top support for the solenoids 13, 13, and is secured to the plates 1, 1.

Secured rigidly to the stationary yoke 14 is a pair of cores 17 extending part way up through the solenoids 13, 13, and topped by non-magnetic caps 18. Movable solenoid-cores 19, 19 extend through the upper part of the solenoids 13, 13, and are fastened, at their upper ends, to the movable iron yoke 20. Depending from this yoke 20 (as at the center thereof) and movable therewith is a dash-pot plunger-arm 21, around which is wound a compression-spring 22, whose upper end bears against a rigid collar 22$^a$ on the arm 21 and whose lower end bears against a cap 23 on a dash-pot 24, which may be secured to the stationary yoke 14. To the dash-pot end of the plunger-arm 21 may be secured a fibrous washer 25, whose circumferential edge turns or curves upward (as shown in detail in Fig. XII). Extending upward from the bottom of the plunger-arm 21 and running lengthwise and interiorly of said arm for a suitable distance is a drill-hole 26, communicating, at its upper end, with a hole 27 extending transversely through the arm at a suitable point above the washer 25. In operation, it will be noted that this peculiar structure permits a rapid down-thrust (while current is being used) and a slow return, due to the escape, at the circumferential edge of the washer 25, of the liquid on the down-thrust and the comparatively slight escape through the channels 26, 27, only, on the up-thrust.

To the outer ends of the movable yoke 20 are pivotally secured the depending upper ends of arms 28, the lower ends whereof are pivotally secured to a rod 29, which, in turn, is pivotally connected to arms 31, 31 pivotally connected to a pinion-shaft 30, rigidly carrying a pair of pinions 34 spaced properly so as to mesh normally each with its appropriate rack 5. It will be noted that, owing to the close fit of the movable solenoid-cores 19, 19 in the solenoids 13, 13, the yoke 20 can only have a straight up-and-down, or strictly vertical, movement, and that the rod 29 swings only in an arc about the pinion-shaft 30.

Carried by the movable rod 29 are a pair of rigid pawls 32, 32, which, by their springs 77, are adapted, on the down-stroke, to engage the ratchet-wheels 33 rigidly carried by the pinion-shaft 30, revolubly supported in the brackets 15, 15.

The invention comprehends means to energize the solenoids 13, 13, at the proper times, and the following is given as an example of efficient mechanism. A commutator, consisting of two segments 51, 52, properly insulated from each other and from the rest of the machine, is mounted on one end of the upper solenoid-support 16. A brush 53 is inclosed in a brush-holder 54, which is mounted on and insulated from the commutating-arm 55, which is pivotally mounted, at its lower end, on the shaft 30. A spring 56 in the brush-holder 54 maintains the brush always in contact with one or both of the commutator-segments 51 or 52; and extensions of clips 56$^a$, 56$^a$, which hold the commutator-segments 51, 52, prevent the brush moving off said segments, and thus, when necessary, serve to confine the whole solenoid movement within the limits prescribed by the spacing of the two clips 56$^a$, 56$^a$ (or width of the segment surface). A commutating lever-arm 55 is L-shaped (see Fig. XIV), the shorter arm 55$^a$ having a slot 57 at its end, in which works a pin 61 on the arm 31. This pin-and-slot arrangement permits of a certain amount of lost motion, in either direction, before the commutator-arm 55 is caused to respond and throw the carbon brush 53 over onto another of the commutator segments 51 or 52. By introducing this lost motion, or play, into the operation of the commutating arm, the solenoid current is made and broken at a maximum speed, thus shortening any sparking at the brush 53 and segments 51, 52, and, also, allows a good conducting brush-surface or total non-conducting surface for a maximum period; in short, it gives a "quick break" to the solenoid current and "quick make." Further to insure a minimum of sparking at the brush 53, a non-inductive resistance 58, shown in the drawing as an incandescent lamp, may be connected, when necessary, as shown in Fig. VIII.

The electrical operation is as follows: The current entering the solenoids 13, 13 through the brush 53 and commutator-segment 52 is maintained until the solenoid movable cores 19, 19 have been drawn down a distance that will permit the pawls 32 upon rising to engage in at least one tooth higher on the ratchets 33. Before this point is reached, the throw of the solenoids will have taken up the lost motion in the slot 57 and have caused the brush 53 to slide over so as to bridge the segments 51 and 52, thus putting the non-inductive resistance 58 in multiple with the solenoids. The brush continuing in its motion toward the segment 51 breaks the solenoid circuit through segment 52, at the same time breaking the non-inductive resistance circuit 58. At this point, the ratchet-pawls 32 will be at their lowest position; and the arc which is caused by breaking the highly inductive solenoid circuit 13 is considerably lessened, owing to the non-inductive resistance 58 being comparatively a short circuit for the solenoid, as compared with the air-gap that the induced current must jump in arcing from the brush 53 to the contact 52. Consequently, the induced solenoid current, instead of forming an objectionable arc when broken, discharges through the non-inductive resistance 58. With small solenoids, or where alternating currents are used, the non-inductive resistance may be dispensed with. As another means of lessening the spark, a condenser (not shown) may be connected, with the resistance 58 omitted, across the contacts 51, 52. Thus, by well known laws of physics, the condenser will absorb the discharge current from the solenoids. The current being broken in the solenoids 13, 13, the movable parts are now lifted slowly by the dash-pot spring 22 until, the lost motion in the slot 57 again being taken up and the brush 53 being moved over onto the contact 52, the current again enters the solenoids 13, 13, to energize them, and the previous operation is repeated. From this, it is evident that almost the full energy of the solenoids is given to moving the panel-system and overcoming the upward thrust of the weak spring 22, and the "current-off" period is increased, owing to the slow return feature of the dash-pot; consequently, with no dash-pot load on the solenoids, when the current is "on", a smaller pair of solenoids and less current will suffice.

Where fire-underwriters' rules require that the switching apparatus be inclosed, a fireproof insulating box will be made to inclose the upper end of the brush 53 and the segments 51, 52; but the construction is not shown, as this would obscure parts essential to the working of the apparatus.

The illumination of the panels, when required, is accomplished by means of the lamp or lamps 62, whose light is intensified by a reflecting metallic (or other material) lining 63, which is preferably used, and which incloses the lamps on top, back and bottom (as shown in Fig. I). The advantage of this lining, furthermore, is that it protects the panels over the lamps from excessive heat, the air in the apparatus being allowed to circulate by entering through bottom openings 64, 64 in the plates 1, 1 and leaving, when heated, at the top openings 65, 65 in said plates. For the same purpose, apertures 66 are provided in the outer casing 67, at the top and bottom, as shown in Fig. I.

To give even illumination to the panel being exposed by the shutter 11, a plate of ground glass 68 is preferably used, and is placed between the lamps 62 and the panels 8, toward the shutter side of the machine or apparatus.

In Figs. XIV and XV, I have shown a rotary motor 60 and its connections to the panel-system to drive the latter. The preferable construction, where a rotary motor 60 is used, is as follows: The motor-shaft 71 carries a worm 69, which meshes with a worm-gear 70 rigidly carried by a counter-shaft 72, also carrying rigidly a pulley 73, which, by a belt 74 guided by idlers 75, passes around and thus revolves a pulley 76 rigidly carried by the pinion-shaft 30', which latter carries the pinions 34', meshing with and driving the racks 5 of the panel-system.

Where a series-wound rotary motor is used to operate any of the types described herein, a resistance may be required in the circuit at starting, since the motor starts under full load. Fig. IX shows how the illuminating lamps 62 may be used as starting resistance. The double-pole, double-throw switch 59 is connected so as to place the series motor 60 in series with the lamps 62 for starting, and, when speed is increased and the switch then thrown over onto the other contacts, to place the motor 60 in parallel with the lamps 62, thereby giving both the motor 60 and the lamps 62 the full voltage of the line. The motors may, of course, be started in the commercial way when they are of a size to warrant the use of the external resistances, or other auxiliary apparatus.

An important modification of my invention is shown in Figs. XVI to XXII, which show what I term my "cylinder-type machine". Essentially, this modification comprehends the following aggroupment of elements: A pair of annular plates $1^a$, $1^a$ are disposed in preferably a horizontal position and are spaced or separated by any suitable means, such as the vertical rods $2^a$, preferably disposed at equal distances at or near the periphery of the plates. Said plates are rigidly carried by a revolubly-mounted central shaft $3^a$, mounted in bearings, at its upper end, in the top plate, or top, $4^a$ of the outer casing $4^{aa}$, and, at its lower end, in a suitable support, such as a brace $5^a$ secured to the cylindrical-shaped side of the outer casing $4^{aa}$, which is provided with the pair of diametrically oppositely disposed openings $4^{aaa}$, $4^{aaa}$, in said cylindrical-shaped side. The shutter in this "cylinder-type machine" is a device which may give a single or multiple exposure (in the drawings, a two-exposure type machine is shown); and it comprises a cylindrical-shaped body portion $6^{aa}$, a top $6^a$, and a bottom $6^{aaa}$, the shaft $3^a$ projecting loosely through said top and bottom. Said shutter has, in its body-portion, shutter-openings $6^{ab}$, $6^{ab}$, (in this instance, two, disposed diametrically opposite each other), and each of less width than either one of the outer casing openings $4^{aaa}$ (see Fig. XIX), but of the exact area of an advertising-panel, whereby to permit, as in the basic model or type of machine, but a single advertising-section or panel to be exposed at a time. Unnecessary parts of the shutter are cut away, to reduce weight, and to permit access of brushes 7$^a$ to slip-rings 8$^a$, which supply current to the interior, revolving cylinder-lights 9$^a$. The advertising-sections, in this "cylinder-type" of machine are, preferably, comprehended by the translucent, endless band or strip 10$^a$ (in this instance, cloth is shown), and an advertising-section or advertising-unit, or unit of advertising-space on said cloth, comprises the area of said cloth between any two adjacent rods 2$^a$, the width between any adjacent two of said rods being that of the shutter-aperture 6$^{ab}$ (as shown clearly in Fig. XIX).

A coiled spring 11$^{ab}$, one end thereof secured to the top 6$^a$ of the shutter and the other end to the top 4$^a$ of the outer stationary casing or shell serves, as is obvious, to return the shutter to normal position, after partial rotation thereof. A stop 12$^a$ secured to the outer cylindrical shell 4$^{aa}$, interiorly thereof, may be provided to limit return movement of the shutter, under the unwinding action of the coiled spring 11$^{ab}$.

The intermittent movement of the shutter, timed in relation to the movement of successive advertising-sections of the band 10$^a$, may be accomplished in various ways; but I prefer the means shown in the drawing, which will now be described.

A leaf-spring 14$^a$ is secured, at one end thereof, to the upper surface of the top 6$^a$ of the shutter and, at its other end, is bent upward to form a horizontal toe 14$^{ab}$; and, intermediate of the ends, said spring carries a depending pin 13$^a$, projecting through the top 6$^a$ and adapted to enter any one of the holes 15$^a$ arranged in an annular series in the top plate 1$^a$. In operation, the pin 13$^a$ engages the proper opening 15$^a$ and locks the shutter to the revolving advertising-band carrier or carriage, so that a section of said advertising-band is exposed through the shutter-opening 6$^{ab}$ throughout the entire length of the outer-casing opening 4$^{aaa}$; when the shutter has thus followed said advertising-section to the point where it should return to engage the shutter again for the next section, a cam 16$^a$, carried interiorly of the outer cylindrical casing 4$^{aa}$ engages the lip or toe 14$^{ab}$ and thus lifts the spring 14$^a$ and, thus, the toe 13$^a$ out of the opening 15$^a$ whereupon the spring 11$^a$ immediately returns the shutter to normal position, when the pin 13$^a$ engages in the succeeding hole 15$^a$, corresponding to the next panel or section of the strip 10$^a$, and the operation is repeated.

The actuating-mechanism for the band or advertising-strip 10$^a$ may comprise any desired arrangement and assemblage of elements; but the preferred means are as follows: A motor 17$^a$ carries on the motor-shaft a worm 18$^a$ engaging or meshing with a worm-gear 19$^a$ rigidly carried on a shaft 21$^a$, which also carries fast thereon a pinion 20$^a$, meshing with an annular rack 22$^{ab}$ carried fast on the shaft 3$^a$ toward the lower end thereof. The base of the machine may, also, be used for the display of a non-changeable sign, and, for this purpose, may be provided with the lower, stationary, translucent panels 24$^a$ carried by the cylindrical shell 4$^{aa}$. Lamps 23$^a$, 23$^a$ may be provided interiorly of the lower part of the cylindrical shell 4$^{aa}$, to throw light through the translucent panels 24$^a$.

The object of the double-openings 6$^{ab}$ in the shutter and the corresponding double openings 4$^{aaa}$ in the outer shell 4$^{aa}$ is that, when the device is placed above a side-walk in front of a building, double efficiency may be secured, for the sign can be read in two directions, namely, from up or down the street.

When exposed to the weather, clear glass windows (not shown) may be provided at the shutter openings.

A still further modification is shown in Figs. XXIII to XXIX of the drawings. In this form, the advertising-strip may comprise a strip of translucent material 1$^{bc}$, such as cloth, specially tough paper, parchment, or the like, which is sewn, glued, cemented, or otherwise fastened, on each of its longitudinal edges, between paired strips of leather 2$^b$, rubber, or other flexible material, disposed longitudinally of the strip 1$^{bc}$; the ends of the strips 1$^{bc}$ and 2$^b$ being fastened or secured together so as to form an endless belt, on which the advertising legends may be marked or placed. Rods 3$^b$ are placed transversely of the strip 1$^{bc}$, and are run through or between the two strips 2$^b$, of each pair thereof, so as to project therebeyond. The belt, so formed, travels over rollers 4$^b$, the ends of the rods 3$^b$ moving in a pair of grooves 6$^b$ cut one in each side of the outer casing 5$^b$, provided at one end with an aperture 5$^{bc}$, through which the advertising-panels are visible. The grooves 6$^b$ serve as guides for the strip or advertising-belt, and prevent sagging between the rollers 4$^b$, and also serve to deflect the rods 3$^b$ so as to be released from shutter-projections 7$^b$ when the shutter 8$^b$ has been pulled down to a point where it should be released from the panel it is following, and return to engage with the next panel. By the term "advertising-panel" or "panel" is meant the area of the advertising-belt comprised between any two adjacent, spaced rods 3$^b$. The projections 7$^b$ are carried by the shutter 8$^b$ and are disposed in the path of movement of the rods 3$^b$, so that each rod successively impinges the projections and thus moves the shutter downward with each advertising-panel, thereby exposing, through the shutter-opening $8^{bc}$ (which is of the same area as an advertising-panel, but of considerably less vertical measurement than the opening $5^{bc}$) the entire area of an advertising-panel, and but one advertising-panel at a time, throughout the entire length of the opening $5^{bc}$. The shutter $8^b$ is suspended and guided for movement in a straight vertical line by any suitable means; preferably, the shutter is guided by the guide-strips $9^b$ carried by the outer casing $5^b$, and is suspended by a shade-roller device, which winds or unwinds, at the top and bottom, a flexible, opaque screen $10^b$, to which the shutter proper $8^b$ is secured. The screen $10^b$ is maintained under proper tension by the springs $12^b$, which, by cords $13^b$ running over idler-pulleys $14^b$ and wound around and fastened to the shafts $15^b$ of drums $11^{bc}$ upon which the screen $10^b$ winds and unwinds, tend to rotate said shafts $15^b$ and, with them, the drums $11^{bc}$. The upper springs $12^b$ are comparatively much more powerful and under a greater tension than the lower springs, which causes the shutter $8^b$ to rise to the upper position when released from the rods $3^b$. The shutter just described is a modification of my original shutter 11, in that it requires less space above and below its operative opening.

Any suitable mechanism may be used to actuate the advertising-belt or strip; but I prefer that shown in the drawings, which will now be described, as follows: A worm $17^b$ on the shaft of a motor $16^b$ meshes with a worm-gear $18^b$ fast on one of the shafts $19^b$ carrying one pair of the rollers $4^b$. Tapering, spaced pegs $20^b$ on the tread of said rollers $4^b$ engage in corresponding, spaced holes $24^b$ in the side strips $2^b$. The pegs $20^b$ in the other rollers $4^b$ are used, when necessary, to prevent frictional wear on the advertising-belt, also to serve to keep the side strips $2^b$ properly spaced, where the nature of the material of the strip $1^{bc}$ would tend to cause an uneven rotation of the strip $1^{bc}$.

Lamps $21^b$ are provided, to give illumination to the strip when the sign is used at night; and the ground glass pane $22^b$, properly supported, as by clips $23^b$ secured to the sides of the casing $5^b$, may be used, to diffuse the light of the lamps $21^b$ so as to produce a very nearly even distribution of the light as seen through the opening in the shutter $8^b$ and the corresponding opening in the case $5^b$.

From the above description, taken in connection with the drawings, the many advantages of my invention will be obvious, especially to those skilled in the art to which the invention pertains. The operation of all forms of the invention is clear from the preceding description, rendering superfluous an elaborate detailed analysis of the operation.

As said, the principal idea in my invention, which is common to the preferred and to all modified forms, is to utilize a movable shutter, instead of a stationary shutter, as heretofore provided, and to time the movement of the shutter relative to the movement of the respective advertising panels, whereby each advertising panel, and but a single advertising panel at a time, is exposed for the full length of the opening in the outer casing, said construction making it possible to expose each advertising-panel to view for a considerably longer time, relatively speaking, than with devices as customarily constructed.

While, as above said, the movable-shutter feature is the principal idea, yet my invention presents many other desirable features, all of which have been explained, *supra*.

I am aware that it is possible to deviate, in details, from the precise constructions herein shown; but it is to be understood that all modifications and changes as come within the terms of the appended claims constitute no departure from the spirit of my invention, and come strictly within the scope and purview thereof.

While I prefer to use the mechanical means, hereinbefore described, for causing release of the coöperating locking-mechanism carried by the panel-system and by the shutter, yet it is possible to dispense with such means, inasmuch as the pitch of the curved corners of the plates 1, 1 could be so adjusted with reference to the shutter-opening that the panels in rounding said curved corners and in thus moving away from the shutter would carry the panel-projections 9 out of engagement with the shutter-projection 10, as is obvious.

The device comprehended by my invention in all its forms may find a very useful and valuable application in connection with theaters and hotels, etc., as it can be mounted in an empty box-office window, or in a recess in the walls of, say, a theater- or hotel-lobby, for the purpose of advertising and giving information concerning current or coming theatrical attractions, lectures, etc. Of course, when my device or apparatus is disposed in a box-office window, or in a recess made in the wall of a theater-lobby, or the like, the usual casing (which customarily surrounds the working parts of my apparatus when said working-parts are used in a situation where they would, if said casing were not used, be exposed to view,) would be omitted, as unnecessary,—the box-office window, or the recess excavated in the walls of a theater-lobby, or the like, taking the place of said casing; the walls of said excavation or box-office window concealing said working parts from view, excepting at the front, which would be open, of course, and which open front would correspond with the usual casing-aperture coöperating with the shutter-aperture.

Having thus fully described my invention, what I claim as new and desire to secure by Letters Patent is:

1. In a changeable exhibitor, the combination with an outer casing having an aperture, of a traveling sign-mechanism disposed within said casing, and an intermittently-movable shutter also disposed in said casing and having a relatively smaller aperture for exposing said sign-mechanism.

2. In a changeable exhibitor, the combination with an outer casing having an aperture, of a traveling sign-mechanism disposed within said casing, an intermittently movable shutter also disposed in said casing and having a relatively smaller aperture for exposing said sign-mechanism, means for moving said shutter in one direction, and means for returning said shutter to normal position after each movement thereof.

3. In a changeable exhibitor, the combination with an outer casing having an aperture, of a traveling sign-mechanism disposed within said casing, an intermittently-movable shutter also disposed in said casing and having a relatively smaller aperture for exposing said sign-mechanism, and electrically-controlled means for effecting such movement of the shutter.

4. In a changeable exhibitor, the combination with an outer casing having an aperture, of a traveling sign-mechanism disposed within said casing, a movable shutter also disposed in said casing and having a relatively smaller aperture for exposing said sign-mechanism, and means for locking together said sign-mechanism and said shutter during predetermined intervals, so that they travel together during such intervals.

5. In a changeable exhibitor, a movable sign-mechanism, an intermittently-movable shutter, coöperative locking means carried by said sign-mechanism and said shutter; and movable means for automatically releasing said locking-mechanisms from coöperative relation, at predetermined times, including: a movable member in the path of movement of said sign-mechanism, and movable mechanism bearing against said shutter and actuated by the movement of said movable member.

6. In a changeable exhibitor, a movable sign-mechanism, an intermittently-movable shutter, coöperative locking means carried by said sign-mechanism and said shutter; and movable means for automatically releasing said locking-mechanisms from coöperative relation, at predetermined times, including: a movable member in the path of movement of said sign-mechanism, and movable mechanism, including a member bearing against said shutter, actuated by the movement of said movable member.

7. In a changeable exhibitor, a movable sign-mechanism, an intermittently-movable shutter, coöperative locking means carried by said sign-mechanism and said shutter; and movable means for automatically releasing said locking-mechanisms from coöperative relation, at predetermined times, including: a movable member in the path of movement of said sign-mechanism, and movable mechanism, including an arm bearing against said shutter, actuated by the movement of said movable member.

8. In a changeable exhibitor, a movable sign-mechanism, an intermittently-movable shutter, coöperative locking means carried by said sign-mechanism and said shutter, and means, including a rocker-arm in the path of movement of said sign-mechanism, for automatically releasing said locking-mechanisms from coöperative relation, at predetermined times.

9. In a changeable exhibitor, a movable sign-mechanism, an intermittently-movable shutter, coöperative locking means carried by said sign-mechanism and said shutter; and movable means for automatically releasing said locking-mechanisms from coöperative relation, at predetermined times, comprehending: a movable member in the path of movement of said sign-mechanism, a rock-shaft to which said movable member is secured, and an arm also secured to said rock-shaft and bearing against said shutter.

10. In a changeable exhibitor, a movable sign-mechanism, an intermittently-movable shutter, coöperative locking means carried by said sign-mechanism and said shutter; and movable means for automatically releasing said locking-mechanisms from coöperative relation, at predetermined times, comprehending: a movable member in the path of movement of said sign-mechanism, a rock-shaft to which said movable member is secured, an arm also secured to said rock-shaft and bearing against said shutter, and means for automatically returning said movable member, rock-shaft and arm to normal position after actuation thereof.

11. In a changeable exhibitor, a movable sign-mechanism, an intermittently-movable shutter, coöperative locking means carried by said sign-mechanism and said shutter; and movable means for automatically releasing said locking-mechanisms from coöperative relation, at predetermined times, comprehending: a movable member in the path of movement of said sign-mechanism, a rock-shaft to which said movable member is secured, an arm also secured to said rock-shaft and bearing against said shutter, and spring means for automatically returning said movable member, rock-shaft and arm to normal position after actuation thereof.

12. In a changeable exhibitor, a movable sign-mechanism, including a rack, a shutter intermittently movable while the sign-mechanism is moving, and electrically-controlled mechanism, including means engaging said rack, for effecting movement of said sign-mechanism.

13. In a changeable exhibitor, a movable sign-mechanism, comprising a series of frames, a series of advertising-panels carried by said frames, and racks operatively associated with said frames; a shutter intermittently movable while the sign-mechanism is moving; and electrically-controlled mechanism, including means engaging said racks, for effecting movement of said sign-mechanism.

14. In a changeable exhibitor, a movable sign-mechanism, comprising a series of frames, a series of advertising-panels carried by said frames, and a pair of racks, each of said racks being formed of sections loosely jointed together, and each section being secured to one of said frames; a shutter intermittently movable while the sign-mechanism is moving; and electrically-controlled mechanism, including means engaging said racks, for effecting movement of said sign-mechanism.

15. In a changeable exhibitor, a movable, wheeled sign-mechanism, comprising a series of frames, a series of advertising-panels carried by said frames, and a pair of racks, each of said racks being formed of sections loosely jointed together, and each section being secured to one of said frames; a shutter intermittently movable while the sign-mechanism is moving; and electrically-controlled mechanism, including means engaging said racks, for effecting movement of said sign-mechanism.

16. In a changeable exhibitor, a traveling sign-mechanism, a shutter intermittently movable while the sign-mechanism is moving, racks operatively associated and movable with said sign-mechanism, driving-gears meshing with said racks, a pair of solenoids having movable cores operable when the solenoids are energized, and mechanism intermediate of and operatively connected with said cores and said driving-gears, to move the latter and thus the racks and sign-mechanism, when the solenoids are energized.

17. In a changeable exhibitor, a traveling sign-mechanism, a shutter intermittently movable while the sign-mechanism is moving, racks operatively associated and movable with said sign-mechanism, driving-gears meshing with said racks, a pair of solenoids having movable cores operable when the solenoids are energized, mechanism intermediate of and operatively connected with said cores and said driving-gears, to move the latter and thus the racks and sign-mechanism, when the solenoids are energized, and means for returning said cores and said intermediate mechanism to normal position upon said solenoids becoming deënergized.

18. In a changeable exhibitor, a traveling sign-mechanism, a shutter intermittently movable while the sign-mechanism is moving, racks operatively associated and movable with said sign-mechanism, driving-gears meshing with said racks, a pair of solenoids having movable cores operable when the solenoids are energized, mechanism intermediate of and operatively connected with said cores and said driving-gears to move the latter and thus the racks and sign-mechanism, when the solenoids are energized, and spring means for returning said cores and said intermediate mechanism to normal position upon said solenoids becoming deënergized.

19. In a changeable exhibitor, a traveling sign-mechanism, a shutter intermittently movable while the sign-mechanism is moving, racks operatively associated and movable with said sign-mechanism, driving-gears meshing with said racks, a pair of solenoids having movable cores operable when the solenoids are energized, mechanism intermediate of and operatively connected with said cores and said driving-gears, to move the latter and thus the racks and sign-mechanism, when the solenoids are energized, and automatically operating mechanism for effecting continuous "make" and "break" of the current through said solenoids.

20. In a changeable exhibitor, a movable sign-mechanism, an intermittently-movable shutter, and coöperative locking means carried by said sign-mechanism and said shutter.

21. In a changeable exhibitor, a movable sign-mechanism, an intermittently-movable shutter, coöperative locking means carried by said sign-mechanism and said shutter and means for automatically releasing said locking-mechanism from coöperative relation, at predetermined times.

22. In a changeable exhibitor, a movable sign-mechanism, an intermittently-movable shutter, a series of separate locking members carried by said sign-mechanism, and coöperative locking-means carried by said shutter, whereby said sign-mechanism and said shutter travel simultaneously together at predetermined times.

23. In a changeable exhibitor, a movable sign-mechanism, an intermittently-movable shutter, coöperative locking means carried by said sign-mechanism and said shutter, and means, including a movable member in the path of movement of said sign-mechanism, for automatically releasing said locking-mechanisms from coöperative relation, at predetermined times.

24. In a changeable exhibitor, the combination with an outer casing having an aperture, of a traveling sign-mechanism disposed within said casing, an intermittently-movable shutter also disposed in said casing and having a relatively smaller aperture for exposing said sign-mechanism, and automatic means for effecting movement of said shutter.

25. In a changeable exhibitor, the combination with an outer casing having an aperture, of a traveling sign-mechanism disposed within said casing, an intermittently-movable shutter also disposed in said casing and having a relatively smaller aperture for exposing said sign-mechanism, and automatic means for effecting movement of said sign-mechanism and shutter.

26. The combination with a traveling sign-mechanism, of an intermittently-movable shutter disposed in front of said sign-mechanism and having an aperture for exposing said sign-mechanism, and a member disposed in front of said shutter and having a relatively larger aperture coöperating with said shutter-aperture for exposing said sign-mechanism.

In testimony whereof, I have hereunto set my hand in presence of two subscribing witnesses.

IRVING W. EDWARDS.

Witnesses:
    WM. F. BULCROFT,
    G. L. EDWARDS.

---

Copies of this patent may be obtained for five cents each, by addressing the "Commissioner of Patents, Washington, D. C."